United States Patent [19] [11] 4,158,317
James [45] Jun. 19, 1979

[54] INFINITE RATIO TRANSMISSION
[76] Inventor: Robert G. James, 3509 Janene Way, Bakersfield, Calif. 93306
[21] Appl. No.: 869,574
[22] Filed: Jan. 16, 1978
[51] Int. Cl.² ............... F16H 15/50; F16H 13/06; F16H 3/74
[52] U.S. Cl. ............................. 74/796; 74/798; 74/752 B; 74/750 B
[58] Field of Search ............... 74/796, 798, 752 B, 74/750 B

[56] References Cited
U.S. PATENT DOCUMENTS

| 1,411,548 | 4/1922 | Yamamoto | 74/750 B |
| 3,293,947 | 12/1966 | Chery | 74/796 |
| 3,990,328 | 11/1976 | Galbraith | 74/796 |

FOREIGN PATENT DOCUMENTS 710460  10/1931  France ........................ 74/798

Primary Examiner—Lance W. Chandler
Attorney, Agent, or Firm—I. Michael Bak-Boychuk

[57] ABSTRACT

A spring washer engaged transmission wherein a plurality of planetary discs are conformed to provide two opposed conical surfaces, the axis of rotation of each disc including the apex of the cone. The planetary discs are received between a first set of two dished washers forming a sun and a second set of similarly shaped washers forming an exterior peripheral ring. Each disc is mounted for rotation on a corresponding pin, the pins being received in cam grooves formed in the driving plate in a first embodiment and being mounted for eccentric rotation in the second embodiment. A centrifugal bob weight attached to each pin in the second embodiment controls the eccentric alignment of the pin thus controlling the displacement of the disc relative the first and second set of dished washers.

12 Claims, 10 Drawing Figures

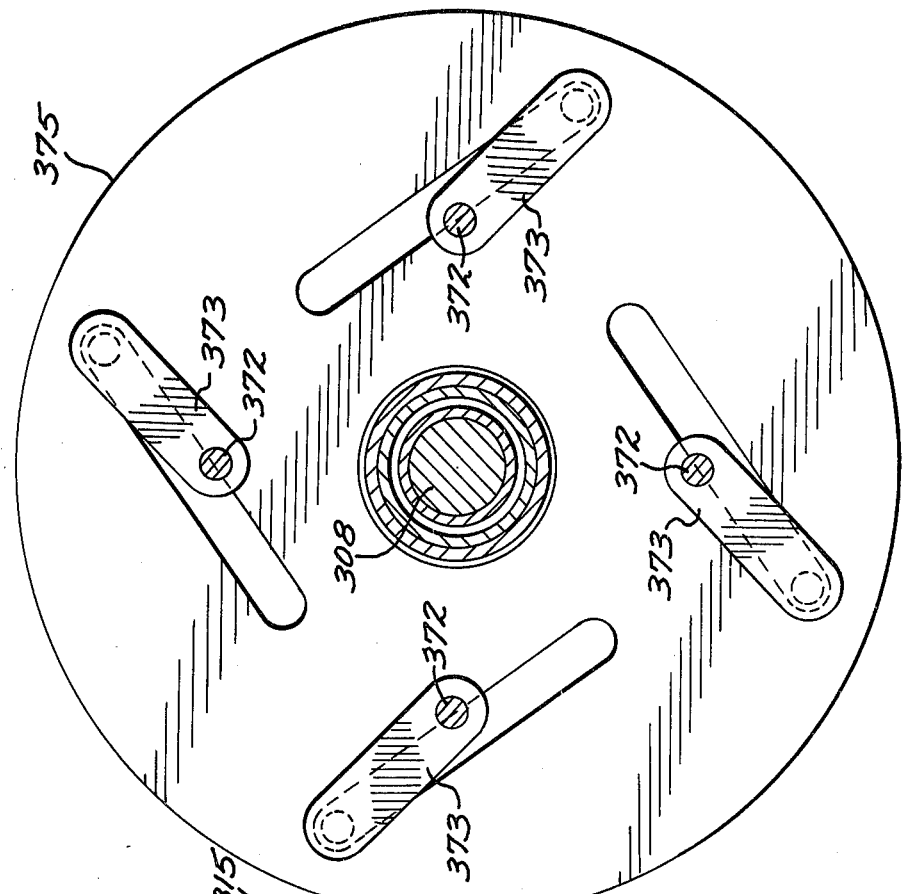
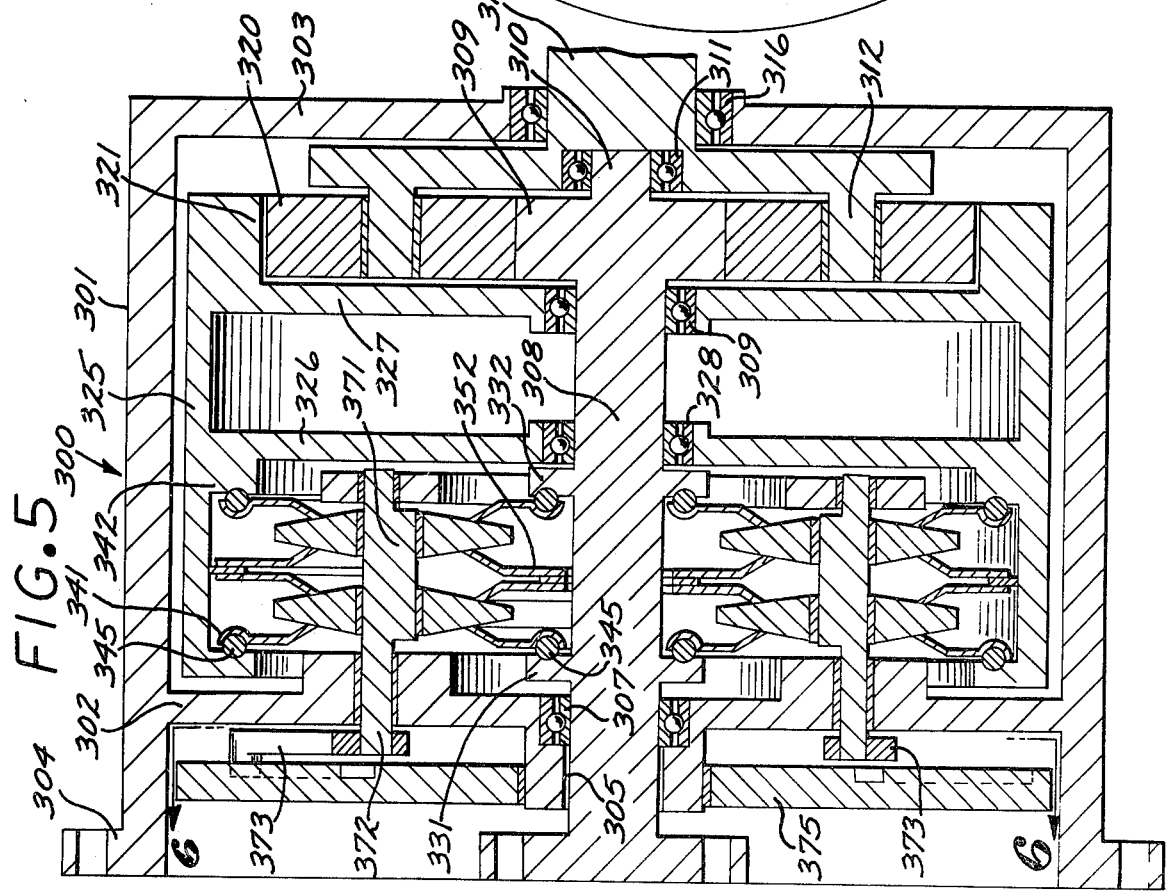

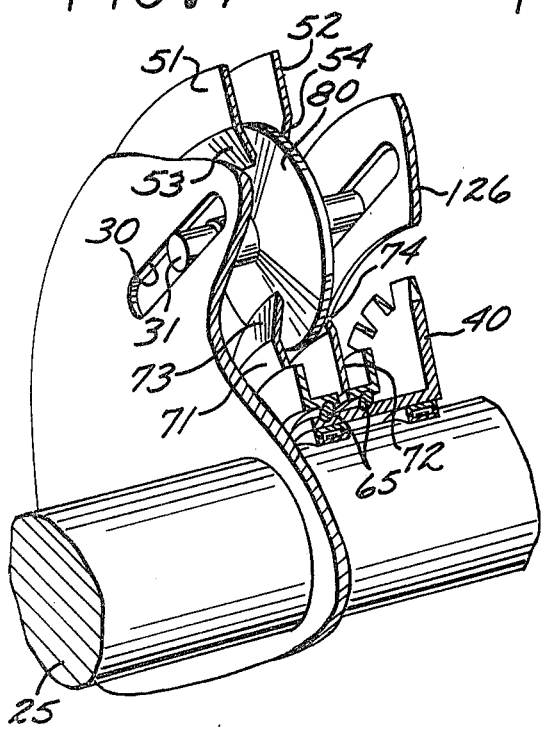
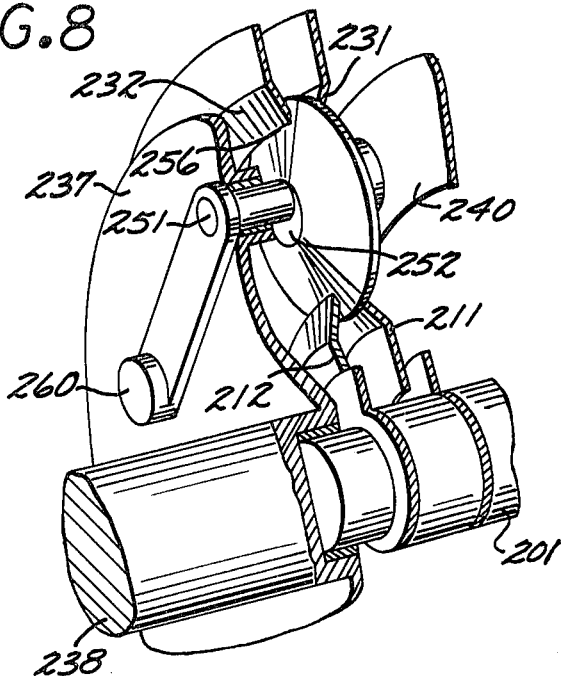
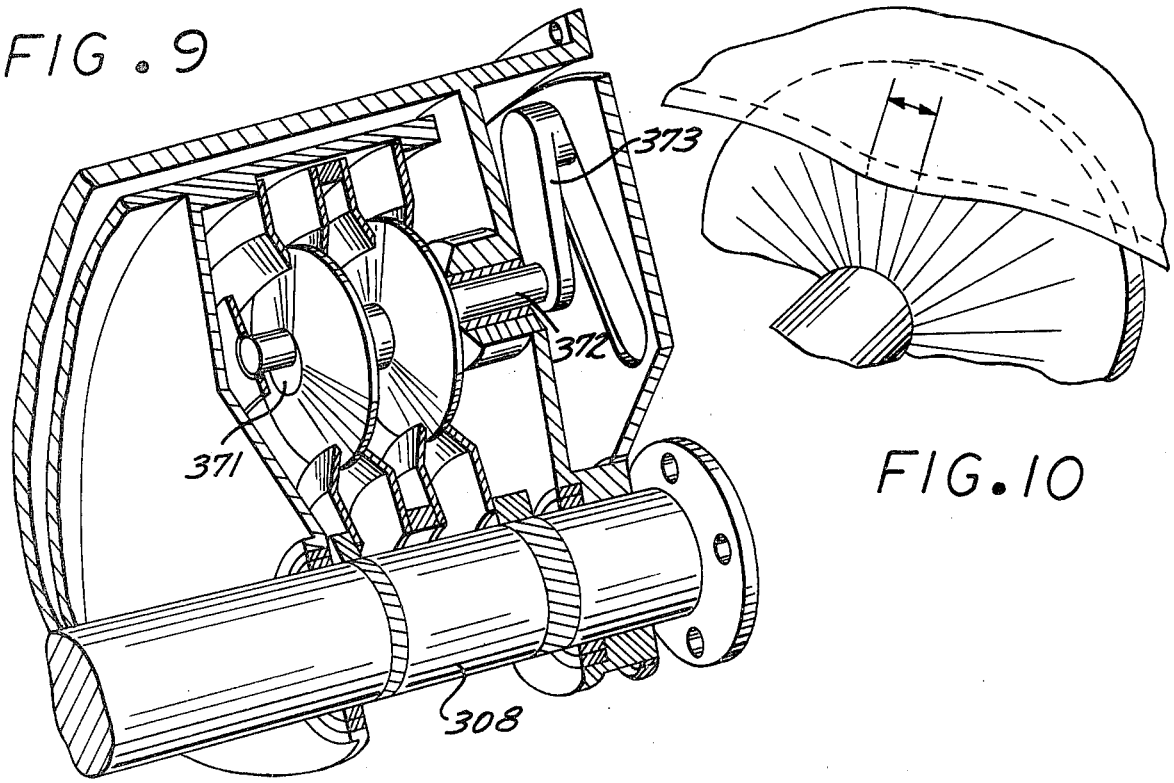

INFINITE RATIO TRANSMISSION

BACKGROUND OF THE INVENTION

1. Field of the Invention

The present invention relates to power transmitting systems, and more particularly to systems conformed to modify ratio according to torque and speed.

2. Description of the Prior Art

Gearing of rotary power for maximum efficiency has had extensive use in the past, a typical powerplant having peaked power characteristics which are to be matched with a load. Similarly, transmission systems are deployed between a human and a driven article to match the optimal limb motion with the desired output rate. In each instance gear changes are typical and as more efficiency is desired a finer gear change increment is entailed. For this reason various infinite ratio gearing arrangements have been developed in the past which in one way or another modify ratio according to speed and torque. Some of these prior art systems utilized elliptic rollers through which the desired gearing is obtained, the rollers being shifted in the contact thereof against the driving and driven surfaces according to load. Systems of this kind though suitable for their purpose, entailed compound rolling surfaces with the attendant cost overhead and difficulty in assembly. Furthermore, systems utilizing such compound surfaces require various spring arrangements for loading the roller contact point to transmit torque. By virtue of the roller geometry and the eventual wear in the rolling surfaces relatively high loadings are required in order to load the contact area to the necessary level of frictional contact. Thus prior art systems of this kind lack the convenience of a small contact area, and in addition utilize spring elements indirectly with the attendant expense of added parts.

SUMMARY OF THE INVENTION

Accordingly it is the general purpose and object of the present invention to provide a torque transmitting system wherein spring elements are displaced in their contact with a tapered surface in order to achieve the desired gearing.

Other objects of the invention are to provide a power transmitting system wherein the transmission ratio is determined by the advance of spring elements over tapered rollers.

Yet further objects of the invention are to provide an infinitely variable gear system the ratio thereof being determined by speed and torque.

Yet additional objects of the invention are to provide an infinitely variable power transmission system which is easy to produce, requires few parts, and is simple in use.

Briefly these and other objects are accomplished in the present invention by providing a planetary arrangement of circular dished spring sets a first set forming the equivalent of a sun gear and a second set forming a ring arrangement. In more detail the first or the sun set comprises two annular sheet metal elements dished around the exterior periphery thereof, these annular elements being mounted in common a central mount in spaced relationship the dished edges thereof being aligned towards each other. Similarly the second or ring set includes two annular elements fixed at the periphery thereof and arranged to provide opposing dished annuli. The sun and ring sets are arranged in a coplanar alignment, each aligned to a common central axis, in a manner of a planetary arrangement. Deployed between the ring and sun sets are a plurality of planetary discs, each formed as a dual conical surface, the planetary discs being mounted for rotation on pins extending to include the apex of each cone. The peripheral edges of each disc, tapered along the conical surfaces, are received between the dished peripheries of the ring and sun sets, the radial displacement of the pins controlling the degree of insertion of the disc in the respective sets.

In a first embodiment the pins are mounted in cam slots formed in the driving plate, thus forming a spider of varying dimensions. In a second embodiment the pins are eccentrically mounted, each being connected to a bob weight which according to the centrifugal loads displaces the planetary discs in their engagement with the sun and ring sets. Alternatively the pins are fixed to a housing, the sun and ring sets being attached to the driving and driven sections of the transmission. The attachment of the pins in this last instance is also eccentric each pin being connected for eccentric articulation to vary the gearing ratio.

BRIEF DESCRIPTION OF THE DRAWINGS

FIG. 5 is a sectional view of yet another embodiment disclosed herein, illustrating a selective gearing arrangement;

FIG. 6 is a plan view, in section, taken along line 6—6 of FIG. 5;

FIGS. 7, 8 and 9 are gearing diagrams of the various transmissions disclosed herein; and FIG. 10 is a detail view of the inventive gearing engagement common to all embodiment set out herein.

DESCRIPTION OF THE PREFERRED EMBODIMENTS

Figure 1:
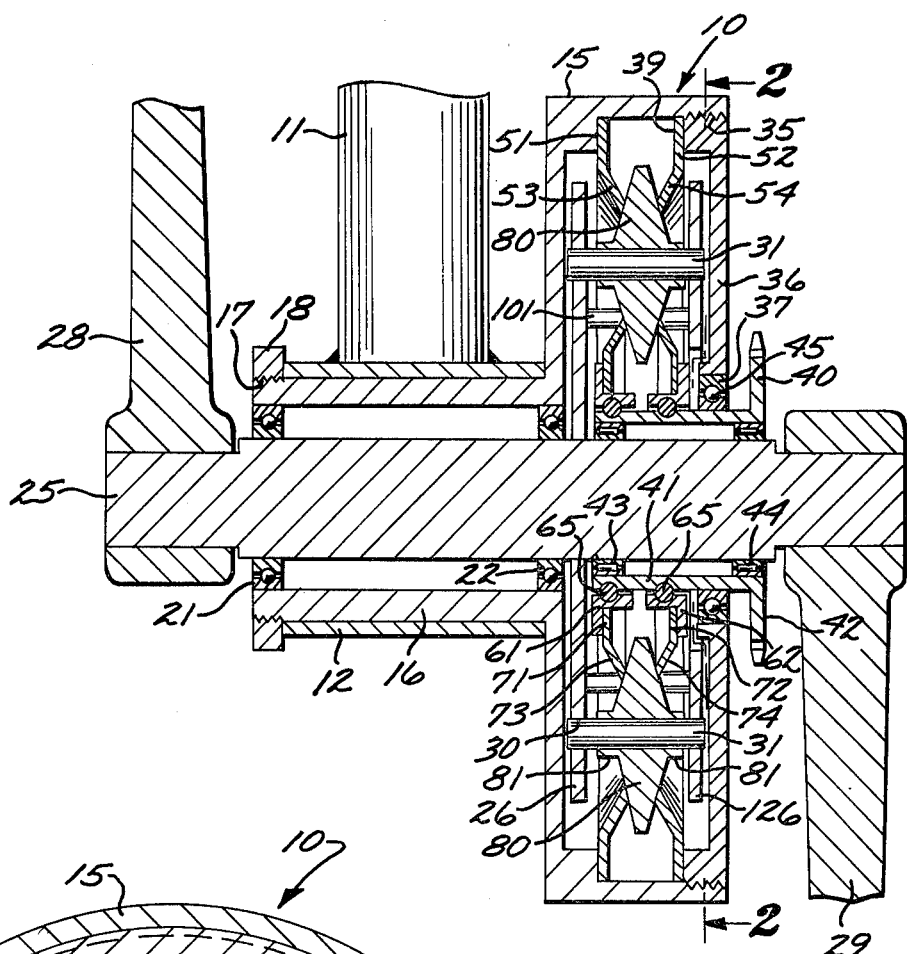
FIG. 1 is a sectional view of an inventive transmission conformed for use in a bicycle according to a first embodiment thereof.

While the following description sets out a selection of alternative implementations of the inventive transmission presently disclosed, such are illustrative only. It is to be understood that other implementations are possible with the principles following and on intent to limit the scope of the invention is expressed by virtue of these examples.

As shown in FIGS. 1, 2, 7 and 10 a first embodiment of the inventive transmission, generally designated by the numeral 10, is conformed for substituted use in a bicycle 11, being inserted into the interior of a bearing housing 12 originally utilized to support the drive sprocket and pedal assembly. Transmission 10 includes a circular housing 15 extending from one end of a tubular segment 16 which is received in the housing 12. Segment 16 terminates in a threaded exterior periphery 17 at the free end thereof, the dimension of the segment being conformed to expose the threads for engagement with a nut 18 at the other side of the bearing housing. Thus nut 18 secures segment 16 to the bicycle, housing 15 being concurrently deployed in a position previously occupied by the drive sprocket.

Deployed on the interior of segment 16, proximate the ends thereof, are two bearings 21 and 22 respectively which support a pedal shaft 25 in rotation. Attached to shaft 25 and extending on the interior of housing 15 is a circular drive plate 26 provided with a plurality of cam slots 30 engaging the ends of a corresponding set of support pins 31. Shaft 25 extends to the exterior of segment 16 and housing 15 on either end where it is secured to pedals 28 and 29 respectively. Housing 15, in turn, is conformed as a dished circular structure including a threaded edge strip 30 on the interior peripheral surface for engaging the exterior periphery of an annular cover 36 threadably received therein. Cover 36 includes a central opening 37 through which shaft 25 projects to engage pedal 29. Mounted in surrounding relationship about shaft 25 and extending also through opening 37 is a sprocket assembly 40 including a tubular support 41 and a sprocket 42 deployed on the end thereof. More specifically support 41 rides on two bearings 43 and 44 deployed on shaft 25 and is furthermore received in a bearing 45 fixed in the opening 37. Thus shaft 25 is directly supported in segment 16 and, through support 41, is supported in opening 37.

The periphery of cover 36 is provided with a shoulder 39 which extends into the interior of housing 15 to oppose yet another shoulder 19 formed therein. Shoulders 19 and 39 are separated according to the threadable insertion of the cover, and are thus adjustable in separates. Retained between shoulders 19 and 39 are two annular dished spring elements 51 and 52, each being dished along the inner periphery to form conical edge surfaces 53 and 54 respectively. The deployment of elements 51 and 52 is arranged to align the conical surfaces 53 and 54 towards each other. In a similar manner support 41 engages two ring retainers 61 and 62 mounted in surrounding relationship thereabout and secured in place by way of a plurality of ball detents 65. Received between retainers 61 and 62, in spaced relationship, is a second pair of spring elements 71 and 72, the exterior peripheral edges thereof being turned once more along conical surfaces 73 and 74 opposing each other. Elements 51, 52 71 and 72 are each made of sheet metal structure, heat treated to provide spring characteristics, the separation between retainers 61 and 62 being controllable by threaded adjustment while the separation between elements 71 and 72 being fixed.

Figure 2:
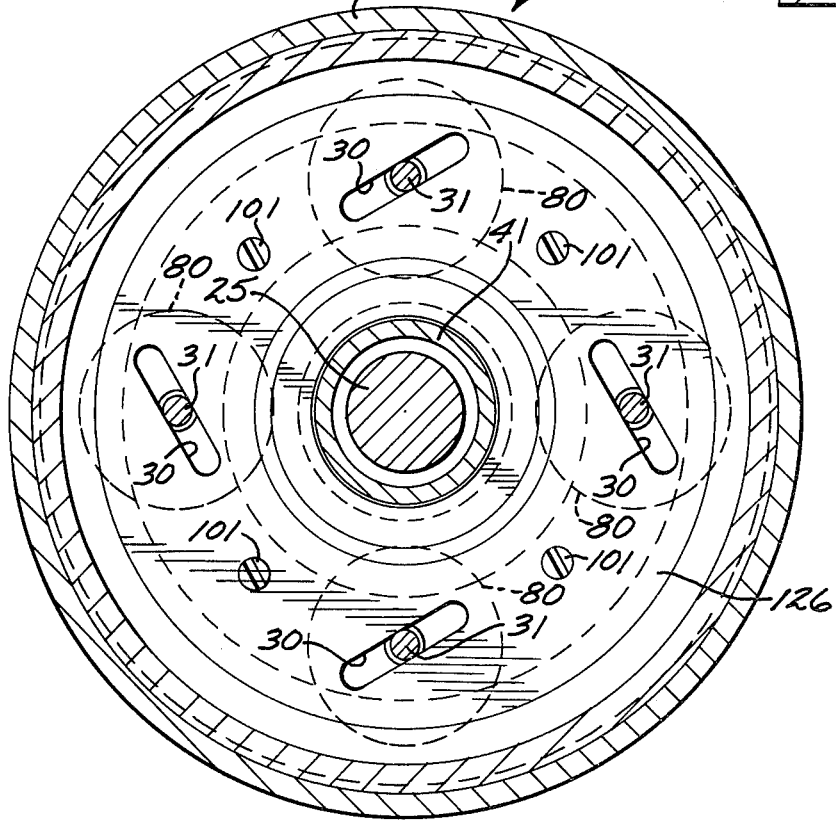
FIG. 2 is a plan view, in section, taken along Line 2—2 of FIG. 1.

Pins 31 extend into the circular space between elements 51 and 52 and 71 and 72, the foregoing elements being arranged in substantially coplanar alignment about a common central axis including the center of shaft 25. The exact disposition of pins 31 within this gap is determined by the translation thereof in slots 30. As shown in FIG. 2 slots 30 are arranged as segments of a spiral in plate 26, a second plate 126, connected by standoffs 101, being similarly cutout to provide opposing slots 130 for maintaining pins 31 parallel.

Deployed on each of the pins 31 and retained in axial translation by the plates 26 and 126 is a corresponding disc 80, each disc 80 being conformed as a double conical structure the lateral surfaces thereof being tapered in revolution to provide a thin peripheral edge. In this form discs 80 are received between elements 51 and 52 along the exterior radii thereof and between elements 71 and 72 along the interior radii. For the purposes herein the term exterior and interior radius refers to dimensions taken relative the center of shaft 25 and extending beyond or within, respectively, the radial location of pins 31.

As set forth above elements 51 and 52 and elements 71 and 72 are separated by a predetermined gap and radial translation of pin 31 within slot 30 is therefore accompanied by a concurrent deformation of the conical edges 53, 54, 73 and 74. By reference to FIG. 7 an outward translation of pin 31 is concurrently accompanied by a reduction of a radius $R_1$, i.e., the exterior radius, meansured between the center of the pin and the point of contact $P_1$ of disc 80 with edge surfaces 53 and 54. At the same time the interior radius, shown as $R_2$ is increased by an equal amount.

Thus the input torque $T_{in}$ applied to plate 26 is converted to an output torque $T_{out}$ at a ratio determined by the radii $R_1$ and $R_2$. This gearing change is determined by the slope of slot 31 and the spring characteristics of elements 51 and 52. To provide for torque transfer elements are fixed in rotation by way of a splined engagement shown as splines 51(a) and 52(a) to housing 15, elements 71 and 72 being similarly splined to retainers 61 and 62. Disc 80 is supported in rotation by pins 31 having formed thereon two axial sleeves or guides 81 extending laterally from the disc to limit the transverse motion thereof.

By the foregoing arrangement of parts the compressive spring forces of elements 51 and 52 are adjustable thus allowing for a ratio preset or an adjustable equilibrium point in the ratio of radii $R_1$ and $R_2$. Beyond this equilibrium point the axis of disc 80, or pin 31, translates with torque application according to the cam shape of slot 30. In each equilibrium condition the point contact loads of the elements on the conical faces of the disc generate sufficient friction levels to transfer torque. This is shown in FIG. 10. More specifically the curvature of the conical surface of disc 80 is subtantially tighter than the edge curvature of the contacting elements. By virtue of this curvature differential a tangent contact is achieved which is limited to a small area as result of the material hardness of the spring steel used in the structure of the elements. The disc itself may be similarly formed of hard steel or may in fact be formed as two conical washers, sometimes called Belleville washers, joined at the exterior periphery.

Figure 4:
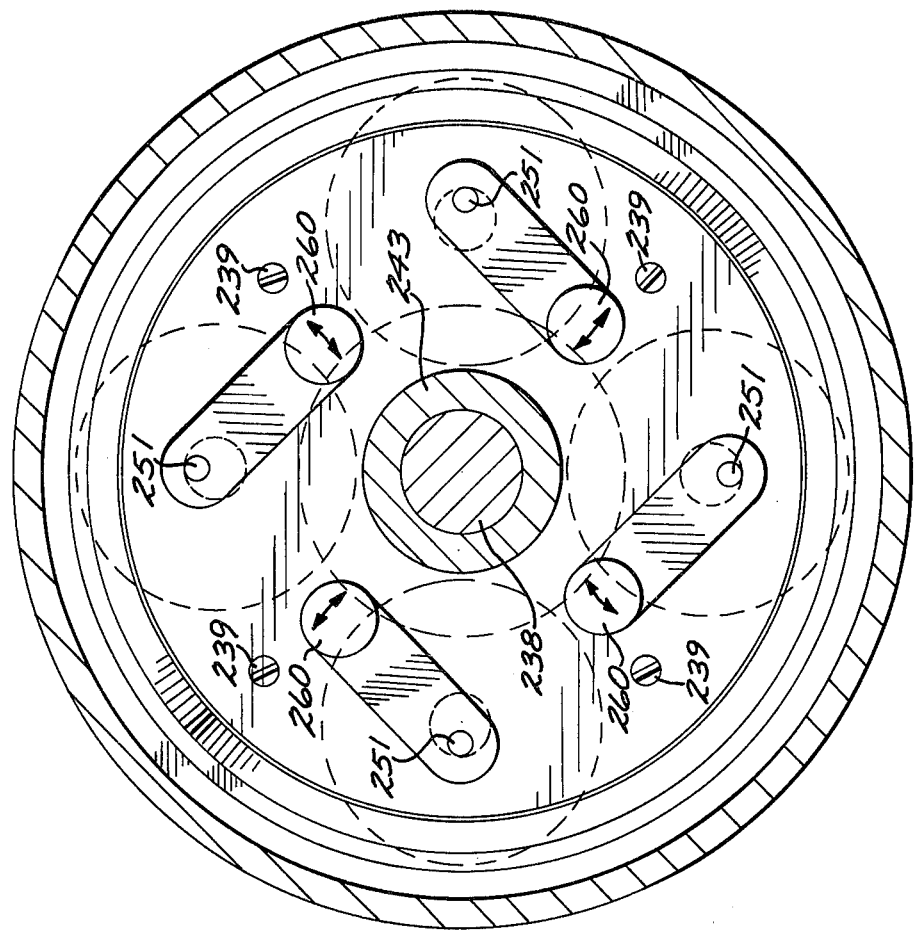
FIG. 4 is a plan view in section taken along line 4—4 of FIG. 3.
Figure 3:
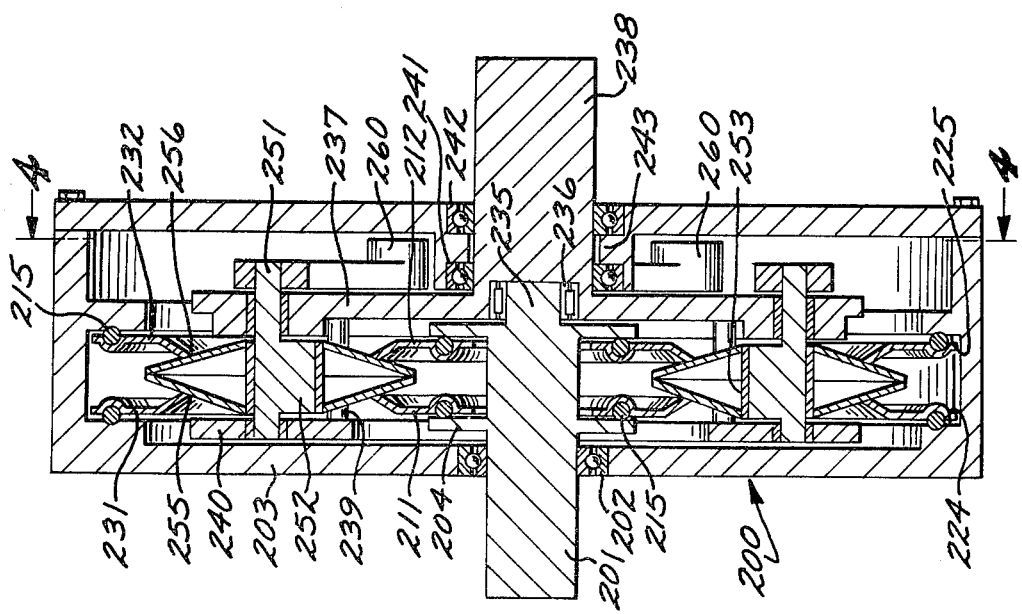
FIG. 3 is a sectional view of a second embodiment of the inventive transmission illustrating a centrifugal gearing arrangement.

An alternative configuration utilizing the foregoing principles is shown in FIGS. 3, 4 and 8. In this embodiment a centrifugally advanced gearing arrangement, generally designated by the numeral 200, includes an input shaft 201 which extends through a bearing 202 into the interior of a circular housing 203. Within housing 203 shaft 201 is arranged to extend two peripheral spaced flanges 204 and 205 utilized to retain a first set of annular spring elements 211 and 212. Elements 211 and 212, once more, form the interior or sun gear equivalent set, being retained radially and in rotation by way of a plurality of retaining balls 215 which also engage the flanges 204 and 205. Similarly housing 203 includes two interior peripheral shoulders 224 and 225 between which a peripheral or ring equivalent set of elements 231 and 232 is retained, once more by retaining balls 215.

Shaft 201 terminates in a reduced diameter axial projection 235 on the distal side of flange 205 which is received in a bearing 236 mounted in the face of an output plate 237 extending from the end of an output shaft 238. Shaft 238 is mounted for rotation in two bearings 241 and 242 seated in an output seat 243 formed centrally in a cover plate 245 closing the housing 203. Plate 237, similar to the prior embodiment, is connected by standoffs 239 to a backing plate 240 to be rotated concurrently therewith. Disposed between plates 237 and 240 proximate the peripheries thereof are a plurality of pins 251 each provided with an eccentric cylindrical support 252 for supporting a sleeve 253 thereon. Supports 252 and sleeves 253 extend between the adjacent faces of plates 237 and 240 and are therefore free to rotate relative each other and in an eccentric path about the centers of pins 251. Extending from the ends of each sleeve 253 and joined thereto are two annular dished washers 255 and 256, each such washer being formed as a conical surface the cone depth being substantially equal to one half of the length of sleeve 253. Thus washers 255 and 256 form an integral structure. Similar to the discs described hereinabove, the structure extending into the interspaces between elements 231 and 232 and elements 211 and 212. This arrangement of parts cooperates to vary the gearing between the input and output shafts according to the radial orientation of pins 251. This radial orientation is controlled by a plurality of bob weights 260 fixed to pins 251 and deployed for centrifugal extension along the distal face of plate 237.

By reference to FIG. 8 elements 211, 212, 231 and 232 each include, once more, conical edge surfaces clamping the abutting washers 255 and 256 therebetween. It is the separation between these elements and the spring coefficients thereof together with the eccentricity and bob weight mass that determine the gearing between the power in $P_{in}$ and power out $P_{out}$ rates.

A further embodiment utilizing the foregoing principles is shown in FIGS. 5,6, and 9. As shown in these Figures a multistage transmission, generally indicated by the numeral 300, is conformed for the preferred use as an automotive transmission included in a cylindrical housing 301 closed by two circular end plates 302 and 303, housing 301 further including a peripheral flange 304 for attachment thereof to a powerplant (not shown). Formed centrally in the end plate 302 is an opening 305 provided with a bearing seat 306 in which a bearing 307 is received. Bearing 307 supports the front end of an input shaft 308 which terminates at the other end in a sun gear 309 provided with an axial projection 310 received in yet another bearing 311 seated in the center of a planetary gear spider 312 on the interior end of an output shaft 315. Shaft 315 is, in turn, journalled in a center bearing 316 seated in the center of the other end plate 303. Geared to the sun gear 309 are a plurality of planetary gears 320 which also engage a ring gear 321 on the end of a ring housing 325. Ring housing 325 furthermore includes two support webs 326 and 327 which are journalled, through bearings 328 and 329 on shaft 308. Shaft 308, between plate 302 and web 326, includes two spaced peripheral flanges 331 and 332 which are substantially coplanar with two opposed shoulders 341 and 342 formed on the interior of the ring housing 325. Disposed between flanges 331 and 332 and retained thereto by retaining balls 345 is a multi-stage ring set comprising a plurality of compressed elements 350. Similarly retained between shoulders 341 and 342 are a further set of ring elements 360. Elements 350 and 360 are aligned in opposing pairs forming an annular chamber within which a plurality of tapered discs 370 is received. Discs 370 are mounted for rotation on eccentric journals 371 supported on pins 372 extending through plate 302 where they are secured to actuating levers 373. The other ends of levers 373 are attached to an actuator plate 375 which is movable to select the angular position of the eccentric journals 371 and therefore the relative insertion of discs 370 in elements 350 and 360.

Once more, by reference to FIG. 9, the gearing is determined by the relative translation of the discs. The embodiment illustrated presently, however, by virtue of the arrangement of ring housing 325 and the planetary output gearing can achieve both forward and reverse output gearing by the articulation of plate 375. This is shown by the arrows $M_1$ and $M_2$. Again the contract through which power is transmitted is as described in FIG. 10, wherein the implementation for the first embodiment is exemplary. The expansion into a plural stage arrangement multiplies the torque capacity to the lever desired.

It is to be noted that in each embodiment the common features are self compensating. The translation of the disc in each instance trades of gear ratio against increasing spring loads. This same feature allows for plural stages, the deformation of each stage accommodating manufacturing variances.

Obviously many modifications and variations to the above disclosure can be made without departing from the spirit of the invention. It is therefore intended that the scope of the invention be determined solely on the claims appended hereto.

What is claimed is:

1. A variable ratio transmission comprising:
   a first set of circular elements including first and second annular, substantially planar spring members aligned coaxially at a predetermined increment of axial separation;
   a second set of circular elements including third and fourth annular, substantially planar, spring members aligned coaxially at said predetermined increment of axial separation, said third and fourth members having exterior peripheries substantially smaller than the interior peripheries of said first and second members;
   mounting means conformed to retain said first and second sets of circular elements in coencentric alignment the respective members thereof being limited to said predetermined increment of separation; and
   a plurality of planetary discs each conformed to include conical lateral surfaces aligned to form a reduced peripheral edge in each said disc, said discs being disposed between said first and second set in interspaced alignment between said members thereof.

2. Apparatus according to claim 1 wherein:
   said discs and said first and second sets are dimensioned to provide a deforming fit therebetween.

3. Apparatus according to claim 2 wherein:
   said discs are operatively mounted for rotation on said mounting means in radially translatable arrangement whereby the radial position of said discs is adjustable relative the axial position of said first and second sets.

4. Apparatus according to claim 1 wherein:
   said first and second members each comprise a sheet metal structure, the interior peripheral edges thereof being bent over towards each other; and
   said third and fourth members each comprise a sheet metal structure, the exterior peripheral edges thereof being bent over towards each other.

5. Apparatus according to claim 4 wherein:

said first, second, third and fourth members are transversely deflexible by said discs received therebetween.

6. Apparatus according to claim 1 wherein:

said mounting means includes a central sun mount for engaging the interior edges of said third and fourth members, a peripheral ring mount for engaging the exterior peripheral edges of said first and second members, and a planetary mount for supporting in rotation said discs.

7. Apparatus according to claim 6 wherein:

said planetary mount comprises a pin carrier disposed proximate said first and second sets and a plurality of pins operatively connected to said carrier and extending into the interspace between said first and second sets to engage said discs thereat.

8. Apparatus according to claim 7 wherein:

said pins are secured for eccentric rotation in said carrier.

9. Apparatus according to claim 8 wherein:

said planetary mount further includes a plurality of bob weights each secured to a corresponding one of said pins.

10. Apparatus according to claim 7 wherein:

said pin carrier includes a plurality of spiral slots each receiving in sliding translation a corresponding one of said pins.

11. Apparatus according to claim 8 wherein:

said pin carrier is fixed in rotation.

12. Apparatus according to claim 11 further comprising:

gearing selector means connected to said pins manual selection of the eccentric alignment thereof relative said pin carrier; and output gear means deployed from said peripheral ring mount including a ring gear attached to said ring mount for concurrent rotation therewith, a plurality of planetary gears meshed with said ring gear, and a sun gear meshed to said planetary gears.

* * * * *